US012463867B1

(12) United States Patent
Srivastava et al.

(10) Patent No.: US 12,463,867 B1
(45) Date of Patent: Nov. 4, 2025

(54) AGENTICALLY-ORCHESTRATED FOUNDATIONAL MODELS FOR CLOUD ARCHITECTURE DEVELOPMENT

(71) Applicant: Google LLC, Mountain View, CA (US)

(72) Inventors: Aayush Srivastava, New York, NY (US); Alison Marlene Andrews, Stonington, CT (US); Priyanka Vergadia, San Jose, CA (US); Adrian Mircea Nenu, London (GB)

(73) Assignee: GOOGLE LLC, Mountain View, CA (US)

( * ) Notice: Subject to any disclaimer, the term of this patent is extended or adjusted under 35 U.S.C. 154(b) by 8 days.

(21) Appl. No.: 18/651,871

(22) Filed: May 1, 2024

(51) Int. Cl.
*H04L 41/0813* (2022.01)
*H04L 67/10* (2022.01)

(52) U.S. Cl.
CPC .......... *H04L 41/0813* (2013.01); *H04L 67/10* (2013.01)

(58) Field of Classification Search
CPC ... H04L 41/0813; H04L 67/10; H04L 63/105; H04L 63/145; H04L 63/0209; H04L 65/104; H04L 65/1069; H04L 47/82
USPC ........................................................ 709/225
See application file for complete search history.

(56) References Cited

U.S. PATENT DOCUMENTS

| | | | |
|---|---|---|---|
| 10,332,384 B1* | 6/2019 | Schryer | G06N 5/025 |
| 2017/0322787 A1* | 11/2017 | Patidar | G06F 8/61 |
| 2019/0068445 A1* | 2/2019 | Chauhan | H04L 67/10 |
| 2019/0342166 A1* | 11/2019 | Chaware | H04L 41/0806 |
| 2021/0200527 A1* | 7/2021 | Sanchez | G06F 8/65 |
| 2022/0413932 A1* | 12/2022 | Telang | G06F 9/505 |
| 2023/0120379 A1* | 4/2023 | Nassar | H04L 41/5096 709/204 |
| 2023/0186117 A1* | 6/2023 | Durvasula | G06N 3/09 706/12 |

FOREIGN PATENT DOCUMENTS

CN 114553865 B * 5/2023 ............. H04L 67/10

* cited by examiner

*Primary Examiner* — Ruolei Zong
(74) *Attorney, Agent, or Firm* — DORITY & MANNING, P.A.

(57) ABSTRACT

User response information is obtained comprising information indicative of cloud architecture requirements for a cloud architecture to fulfill. Based on the user response information, a plurality of agentic orchestration models are used to generate a respective plurality of role outputs, each of the plurality of agentic orchestration models comprising a machine-learned language model prompted to fulfill a corresponding cloud architecting role of a plurality of cloud architecting roles, wherein one of the plurality of role outputs is indicative of a plurality of proposed generic component placeholders for components necessary to meet the cloud architecture requirements. Based on the plurality of role outputs, a proposed architecture output is generated comprising a visual representation of the proposed generic component placeholders.

20 Claims, 7 Drawing Sheets

AGENTICALLY-ORCHESTRATED FOUNDATIONAL MODELS FOR CLOUD ARCHITECTURE DEVELOPMENT

FIELD

The present disclosure relates generally to development of cloud-based architectures. More specifically, the present disclosure relates to utilizing foundational models representing particular agent roles (e.g., developers, designers, etc.) to develop cloud architectures.

BACKGROUND

Cloud computing generally refers to large, distributed networks of computing resources (e.g., Central Processing Units (CPUs), memory, storage, etc.) used to deliver computing services (e.g., servers, storage, databases, networking, software, etc.) over the internet. Cloud computing systems enable users to access resources and applications from anywhere with an internet connection, without the need for physical infrastructure or on-premises hardware. Cloud computing systems are conventionally implemented in partnership with cloud computing platforms. Generally, a cloud computing platform will own a distributed network of computing resources that can be leveraged by users to implement cloud systems that the user develops. In addition, many cloud computing systems leverage virtualization technology, such as containers or virtual machines, to more efficiently allocate computing resources to users. For example, rather than assigning a CPU core exclusively to a user, a cloud platform may instantiate multiple virtual machines to implement cloud computing systems for multiple users, and the virtual machine can utilize the CPU core on an as-needed basis.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a computing system comprising one or more processor devices, user response information comprising information indicative of cloud architecture requirements for a cloud architecture to fulfill. The method includes, based on the user response information, using, by the computing system, a plurality of agentic orchestration models to generate a respective plurality of role outputs, each of the plurality of agentic orchestration models comprising a machine-learned language model prompted to fulfill a corresponding cloud architecting role of a plurality of cloud architecting roles, wherein one of the plurality of role outputs is indicative of a plurality of proposed generic component placeholders for components necessary to meet the cloud architecture requirements. The method includes, based on the plurality of role outputs, generating, by the computing system, a proposed architecture output comprising a visual representation of the proposed generic component placeholders.

Another example aspect of the present disclosure is directed to a computing system. The computing system includes one or more processor devices and one or more tangible, non-transitory computer readable media storing computer-readable instructions that when executed by the one or more processor devices cause the computing system to perform operations. The operations include obtaining user response information comprising information indicative of cloud architecture requirements for a cloud architecture to fulfill. The operations include, based on the user response information, using a plurality of agentic orchestration models to generate a respective plurality of role outputs, each of the plurality of agentic orchestration models comprising a machine-learned language model prompted to fulfill a corresponding cloud architecting role of a plurality of cloud architecting roles, wherein one of the plurality of role outputs is indicative of a plurality of proposed generic component placeholders for components necessary to meet the cloud architecture requirements. The operations include, based on the plurality of role outputs, generating a proposed architecture output comprising a visual representation of the proposed generic component placeholders.

Another example aspect of the present disclosure is directed to one or more tangible, non-transitory computer readable media storing computer-readable instructions that when executed by one or more processor devices cause the one or more processor devices to perform operations. The operations include obtaining user response information comprising information indicative of cloud architecture requirements for a cloud architecture to fulfill. The operations include processing the user response information with a first agentic orchestration model of a plurality of agentic orchestration models to obtain a first role output associated with a component identification role, wherein each of the plurality of agentic orchestration models comprises a machine-learned model that fulfills a corresponding role of a plurality of roles, and wherein the first role output identifies a plurality of proposed generic component placeholders for components necessary to meet the cloud architecture requirements. The operations include processing the user response information and the first role output with a second agentic orchestration model of the plurality of agentic orchestration models to obtain a second role output associated with a networking role, wherein the second role output is indicative of a plurality of proposed interactions between the plurality of proposed generic component placeholders. The operations include processing the user response information and at least the second role output with a third agentic orchestration model of the plurality of agentic orchestration models to obtain a third role output associated with a visual depiction role, wherein the third role output comprises a visual representation of the plurality of proposed generic component placeholders and the plurality of proposed interactions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
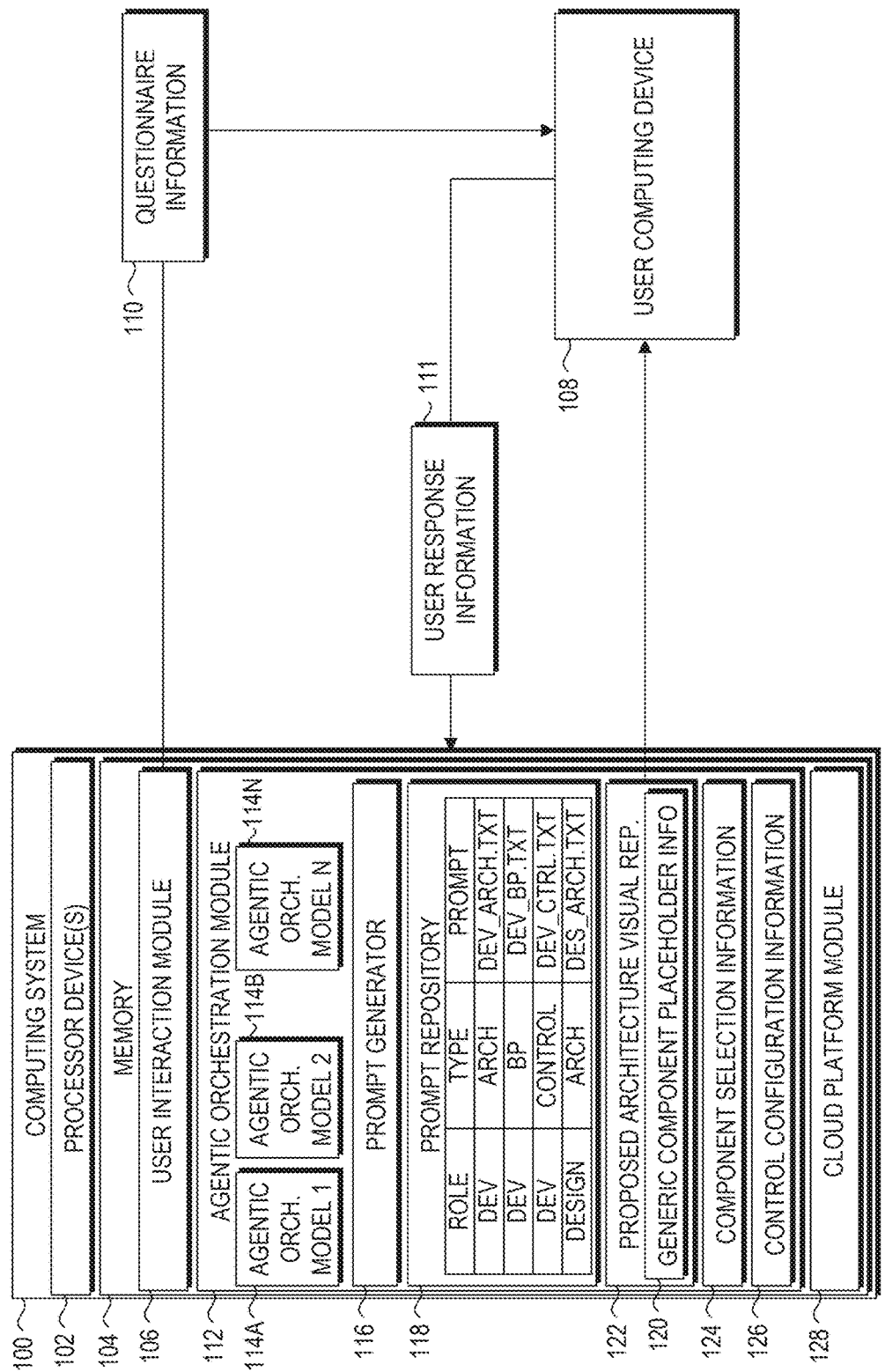
FIG. 1 depicts an overview block diagram of a computing system for agentically-orchestrated foundational models for cloud architecture development according to some implementations of the present disclosure.

Reference numerals that are repeated across plural figures are intended to identify the same features in various implementations.

DETAILED DESCRIPTION

Generally, the present disclosure is directed to utilizing foundational models representing particular agent roles (e.g., developers, designers, etc.) to develop cloud architectures. More specifically, cloud computing systems generally refer to distributed networks of computing resources used to deliver computing services over the internet. Cloud computing systems provide a number of advantages, such as enabling users to access resources and applications from anywhere with an internet connection, and more efficient allocation of computing resources via virtualization technologies. Cloud computing systems are conventionally implemented in partnership with cloud computing platforms. If a user wishes to create a cloud computing system, the user can develop a cloud architecture for a cloud system and then partner with a cloud computing platform to implement the cloud architecture using the distributed network of computing resources owned by the cloud computing platform.

However, cloud architectures are very complex, and development of such architectures can be prohibitively difficult. In particular, developing robust cloud systems generally requires a number of subject matter experts in cloud architecture, cloud infrastructure, cloud security, networking, computer science, etc. to work in concert to develop such a system. Furthermore, even with access to such subject matter experts, development of cloud systems can be prohibitively time consuming. Finally, cloud architectures designed without the expertise provided by subject matter experts are usually substantially more vulnerable to security exploits and malicious actors. Due to these hurdles, many smaller entities lack the resources to implement robust cloud systems, and are thus unable to leverage the many advantages provided by cloud computing. As such, a technique to create cloud architectures more efficiently and effectively would provide a variety of benefits.

Accordingly, implementations described herein propose agentically-orchestrated foundational models for cloud architecture development. As described herein, "agentically orchestrated" models generally refer to machine-learned model instances that are prompted to conversationally perform a particular role associated with cloud architecture development (e.g., designers, architects, security engineers, etc.). Specifically, the agentically orchestrated model instances can refer to instances of Large Foundational Models (LFMs) (e.g., large language models, etc.) which have been trained using large corpuses of training data that includes extensive information related to cloud architecture development (e.g., from subject matter experts, etc.).

As an example, a user who wishes to develop a cloud architecture may provide user response information (e.g., responses to a questionnaire, etc.) that indicates certain cloud architecture requirements for the cloud architecture to fulfill, such as a maximum number of connections, preferred security standards, necessary storage resources, necessary compute resources, etc. A first agentic orchestration model prompted to fulfill a particular role (e.g., a cloud architect role) can process the user response information to generate a role output that indicates proposed generic component placeholders necessary to meet the cloud architecture requirements. The generic component placeholders can serve as generic "placeholders" for functions necessary for cloud architectures. Examples of generic component placeholders can include a "database" placeholder, a "storage" placeholder, a "firewall" placeholder, etc.

A second agentic orchestration model prompted to fulfill a different role (e.g., a cloud design role) can process the user response information alongside the role output from the first agentic orchestration model to obtain a second role output. The role output can correspond to the role fulfilled by the second agentic orchestration model. For example, if the user response information indicates that the user wishes to receive a visual representation of the cloud architecture, the second agentic orchestration model can be prompted to fulfill a cloud design role, and the role output can include a visual representation of the proposed generic component placeholders.

For another example, if the user response information indicates that the user wishes to receive proposed cloud components, the second agentic orchestration model can be prompted to fulfill a solutions architect role, and the role output can include configuration information indicative of cloud components selected for the proposed generic component placeholders. Examples of cloud components include a particular database software (e.g., selected for the "database" placeholder), a particular type of firewall software or service provider (e.g., selected for the "firewall" placeholder), etc.

Agentic orchestration models can be further leveraged to perform a variety of other cloud architecture development roles to obtain a variety of different role outputs. Examples of other role outputs include comparison outputs (e.g., a comparison between a proposed cloud architecture and a current cloud architecture), validation outputs (e.g., validating that a proposed cloud architecture is viable), control outputs (e.g., suggested security controls for a proposed cloud architecture), etc. In such fashion, by leveraging LFMs trained with such knowledge by prompting the LFMs to emulate particular roles, implementations described herein can develop cloud architectures for users while obviating many of the inefficiencies associated with cloud architecture development.

Aspects of the present disclosure provide a number of technical effects and benefits. As one example technical effect and benefit, implementations described herein can substantially reduce the resources required to develop cloud architectures. In addition, implementations described herein can be utilized to validate and verify existing architectures, thus improving efficiency and ensuring that security vulnerabilities are discovered. For example, assume that a user wishes to develop a cloud architecture to provide a particular service. Further assume that the user lacks sufficient resources to develop such a cloud architecture. Using conventional techniques, the user may be forced to develop a sub-optimal architecture, or may refrain from providing the service entirely. However, implementations described herein can be leveraged (e.g., by cloud platforms, etc.) to enable users to effectively and efficiently develop their own cloud architectures. In such fashion, implementations described herein can substantially improve the functioning of cloud computing systems and cloud platforms leveraged to implement such systems.

With reference now to the Figures, example implementations of the present disclosure will be discussed in further detail.

FIG. 1 depicts an overview block diagram of a computing system for agentically-orchestrated foundational models for cloud architecture development according to some implementations of the present disclosure. In particular, a computing system 100 can include processor device(s) 102 and memory 104. In some implementations, the computing system 100 may be a computing system that includes multiple computing devices. Alternatively, in some implementations, the computing system 10 may be a distributed network of computing resources. Similarly, the processor device(s) 102 may include any computing or electronic device capable of executing software instructions to implement the functionality described herein. The memory 104 can be or otherwise include any device(s) capable of storing data, including, but not limited to, volatile memory (random access memory, etc.), non-volatile memory, storage device (s) (e.g., hard drive(s), solid state drive(s), etc.).

The memory 104 can include a user interaction module 106. The user interaction module 106 can receive information to a user computing device 108. For example, the user interaction module 106 can generate questionnaire information 110 that describes a cloud architecture questionnaire which includes architecture queries related to requirements of the cloud architecture that the user desires. In response, the user interaction module can receive user response information 111 from the user computing device. The user response information 111 can include user responses to the queries, and can indicate certain cloud architecture requirements for the proposed cloud architecture to fulfill.

In some implementations, the user response information 111 can be, or otherwise include, an image, diagram, etc. depicting a cloud architecture and/or generic component placeholders to be included within a proposed cloud architecture. For example, the user response information 111 can be an image depicting a visual representation of an architecture, such as a drawing or sketch produced by a user, that depicts at least some of the generic component placeholders. In this manner, the input can be modified to produce a refined visual representation rather than generating a visual representation de novo. Additionally, the capability to process visual representations of a cloud architecture enables models, such as agentic orchestration models, to iteratively refine the outputs of previous models. In this manner, agentic orchestration models prompted to perform different tasks can iteratively contribute to a visual representation of a cloud architecture to add additional detail and/or validate previous additions from prior models.

The memory 104 can include an agentic orchestration module 112. The agentic orchestration module 112 can instantiate, de-instantiate, train, optimize, utilize, and otherwise manage agentic orchestration models 114A-114N (generally, agentic orchestration models 114). As described previously, the agentic orchestration models 114 can be or otherwise include Large Foundational Models (LFMs). As described herein, a LFM refers to a machine-learned model that has been trained on large corpuses of training data, including training data associated with subject matter experts in cloud system architectures. For example, the agentic orchestration models 114 may be large language models trained to generate textual content. For another example, the agentic orchestration models 114 can be multimodal LFMs trained to generate textual content, images, audio, program-specific information (e.g., machine-readable code, machine-readable markup language, etc.), etc.

The agentic orchestration module 112 can include a prompt generator 116 and a prompt repository 118. The prompt generator 116 can generate prompts for the prompt repository. The prompts stored to the prompt repository can be utilized to prompt the agentic orchestration models 114, or instances thereof, to fulfill certain cloud architecture development roles (i.e., "cloud architecting" roles). Cloud architecting roles can include any type or manner of role typically assigned to an agent, such as an employee, for the purposes of cloud architecture development. Examples of cloud architecting roles include cloud architects, algorithm developers, software engineers, cloud designers, visual designers or artists, back-end developers, developer operations specialists, etc.

It should be noted that, although the agentic orchestration models 114 are depicted as being separate models, the agentic orchestration models 114 are not necessarily discrete and independent models. For example, the agentic orchestration models 114 can be instances of the same LFM that are prompted to perform different cloud architecting roles. Alternatively, the agentic orchestration models 114 can be different LFMs (or instances thereof) that are trained, fine-tuned, or otherwise optimized to fulfill a particular cloud architecting role.

In some implementations, the prompt generator 116 may pre-populate the prompt repository 118 with prompts for known roles. Additionally, or alternatively, the prompt generator 116 can generate a prompt based on the type of task specified by the user response information 111. Specifically, in some implementations, the user response information 111 can specify a type of task for the agentic orchestration module to complete, and the prompts provided to the agentic orchestration models 114 can be selected based on the specified task. For example, if the user response information 111 indicates a visual representation task, the prompt generator 116 can generate a cloud design or artist prompt for one of the agentic orchestration models 114. For another example, if the user response information 111 indicates a text generation task (e.g., for a written summary or overview of the proposed cloud architecture), the prompt generator 116 can generate a cloud technical writer or support specialist prompt for one of the agentic orchestration models 114.

In some implementations, the agentic orchestration module 112 can leverage the agentic orchestration models 114 to generate generic component placeholder information 120. The generic component placeholder information 120 can describe proposed generic component placeholders for components necessary to meet the cloud architecture requirements described by the user response information. In other words, the generic component placeholder information 120 can describe "types" of components that will be needed to implement the proposed cloud architecture.

As described herein, a "component" generally refers to a collection of hardware and/or software resources that collectively provide a function or service. For example, assume that a particular type of database is selected for a generic database placeholder. The selected database may be utilized by instantiating that particular type of database using cloud platform resources. Alternatively, the selected database may be utilized by partnering with a database service provider that instantiates and maintains that particular type of database using third-party resources. As such, the existence of a proposed generic component placeholder does not necessarily imply selection of a component to be implemented using cloud resources.

Examples of proposed generic component placeholders can include a "database" placeholder, a "firewall" placeholder, etc. Cloud components (e.g., a specific database service offering, a specific firewall service offering, etc.) can later be selected to fulfill the proposed generic component placeholders. In such fashion, the agentic orchestration module 112 can leverage the prompt repository 118 and the agentic orchestration models 114 to identify the types of components necessary to implement the proposed cloud architecture while meeting the cloud architecture requirements specified in the user response information 111. Generation of generic component placeholder information 120 will be discussed in greater detail with regards to FIGS. 2-4.

Additionally, in some implementations, the agentic orchestration module 112 can leverage the agentic orchestration models 114 to generate a visual representation 122 of the generic component placeholder information 120. The visual representation 122 can be a diagram of the proposed cloud architecture that depicts the proposed generic component placeholders. For example, the agentic orchestration module 112 can select a prompt from the prompt repository 118 to prompt one of the agentic orchestration models 114 to fulfill a visual design or artist role. Additionally, the visual representation 122 can depict proposed interactions between the generic component placeholders. For example, a proposed interaction may exist between a generic database component placeholder and a generic storage component placeholder (e.g., for storing database backups). The agentic orchestration module 112 can select a prompt from the prompt repository 118 to prompt one of the agentic orchestration models 114 to fulfill a networking role. Generation of the visual representation 122 will be discussed in greater detail with regards to FIGS. 2-4.

As described previously, in some implementations, the user response information 111 can be, or otherwise include, an image, diagram, etc. depicting a cloud architecture and/or generic component placeholders to be included within a proposed cloud architecture. The agentic orchestration models 114 can be used to process the visual representation to refine the visual representation. For example, assume that the agentic orchestration module 112 processes the user response information 111 with one of the agentic orchestration models 114 prompted to fulfill a database engineering role to obtain a visual representation that depicts a generic database component placeholder. The agentic orchestration module 112 can process the visual representation with one of the agentic orchestration models 114 prompted to fulfill a storage engineering role to obtain a modified visual representation that depicts the generic database component placeholder and the generic storage component placeholder. The agentic orchestration module 112 can process the modified visual representation with another of the agentic orchestration models 114 prompted to fulfill a network engineering role to modify the visual representation such that the visual representation depicts a proposed interaction between the generic database component placeholder and a generic storage component placeholder.

The user response information 111 can be an image depicting a visual representation of an architecture, such as a drawing or sketch produced by a user, that depicts at least some of the generic component placeholders. In this manner, the input can be modified to produce a refined visual representation rather than generating a visual representation de novo. Additionally, the capability to process visual representations of a cloud architecture enables models, such as agentic orchestration models, to iteratively refine the outputs of previous models. In this manner, agentic orchestration models prompted to perform different tasks can iteratively contribute to a visual representation of a cloud architecture to add additional detail and/or validate previous additions from prior models. The above process can also be leveraged to modify or refine other model outputs described herein, such as the generic component placeholder information 120, the component selection information 124, the security control information 126, etc.

Additionally, or alternatively, in some implementations, the agentic orchestration module 112 can leverage the agentic orchestration models 114 to generate component selection information 124. The component selection information 124 can describe components selected for the placeholders indicated by the generic component placeholder information 120. For example, if the generic component placeholder information 120 includes a generic database placeholder, the component selection information 124 can describe a particular database technology (e.g., a relational database, a non-relational database, etc.) and/or a specific type of database (e.g., Structured Query Language (SQL), mySQL, PostgreSQL, etc.). The component selection information 124 can be generated by prompting one (or more) of the agentic orchestration models 114 with a prompt from the prompt repository 118 that instructs the model to fulfill a database-related role, such as a database engineer role. In some implementations, the component selection information 124 selects a set of cloud services from a plurality of candidate cloud services.

Additionally, or alternatively, in some implementations, the agentic orchestration module 112 can leverage the agentic orchestration models 114 to generate control configuration information 126. The control configuration information 126 can describe controls selected for the selected components indicated by the component selection information 124. As described herein, a security "control" refers to measure(s), mechanism(s), policy(s), etc. implemented to protect digital assets, information, systems, and networks from security threats and vulnerabilities. Security controls work to mitigate risks, deter potential attackers, detect security incidents, and respond effectively to security breaches. Security controls can take various forms, including technical controls such as firewalls, encryption, intrusion detection systems, and access controls, as well as procedural controls like security policies, user training, incident response plans, compliance frameworks, etc.

For example, assume that the component selection information 124 selects a particular type of database for a corresponding generic database placeholder described by the generic component placeholder information 120. The control configuration information 126 can describe one or more controls selected for the particular type of database. For example, the control configuration information 126 may describe a particular access policy for the database, a particular malicious actor detection technology to utilize in conjunction with the database, a mitigation strategy for a known vulnerability associated with the database, etc. The control configuration information 126 can be generated by prompting one (or more) of the agentic orchestration models 114 with a prompt from the prompt repository 118 that instructs the model to fulfill a security-related role, such as a cybersecurity engineer role, a developer operations specialist role, etc.

In some implementations, the memory 104 can include a cloud platform module 128. The cloud platform module 128 can deploy the components and controls indicated by the component selection information 124 and the control configuration information 126, respectively. For example, assume that the computing system 100 is associated with a cloud platform provider. As described previously, a cloud platform provider can generally refer to an entity that provides access to distributed networks of computing resources to implement various cloud services. As such, by deploying the components and controls indicated by the component selection information 124 and the control configuration information 126, the cloud platform module 128 can deploy a cloud service (and corresponding architecture) for the user computing device 108.

Figure 2:
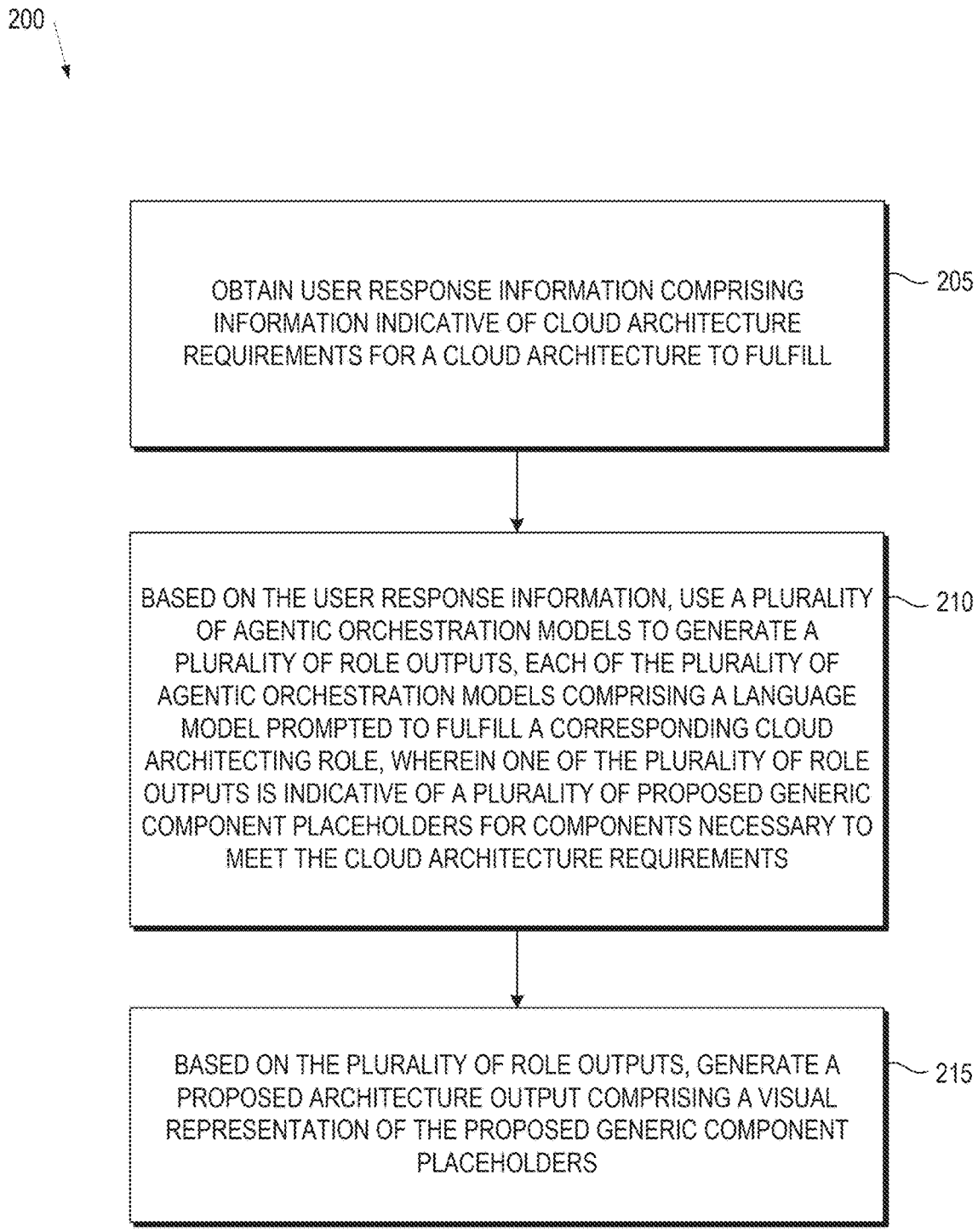
FIG. 2 is a flow diagram of an example method for leveraging agentically-orchestrated foundational models to identify proposed generic component placeholders for a proposed cloud architecture, in accordance with some implementations of the present disclosure.

FIG. 2 is a flow diagram of an example method 200 for leveraging agentically-orchestrated foundational models to identify proposed generic component placeholders for a proposed cloud architecture, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the computing system 100 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 205, processing logic can obtain user response information comprising information indicative of cloud architecture requirements for a cloud architecture to fulfill.

At operation 210, the processing logic can, based on the user response information, use agentic orchestration models to generate corresponding role outputs. Each of the agentic orchestration models can include a LFM, such as a language model, that is prompted to fulfill a corresponding cloud architecting role. One of the role outputs can be indicative of proposed generic component placeholders for components necessary to meet the cloud architecture requirements.

In some implementations, using the agentic orchestration models to generate the role outputs can include processing the user response information with a particular agentic orchestration model to obtain a corresponding role output associated with a component identification role (e.g., a cloud architect, a cloud engineer, a test engineer, a quality assurance specialist, etc.). The corresponding role output identifies the plurality of proposed generic component placeholders for the components necessary to meet the cloud architecture requirements.

Additionally, or alternatively, in some implementations, using the agentic orchestration models to generate the role outputs can include processing, by the computing system, the user response information and the role output described previously with some other agentic orchestration model to obtain an additional role output associated with a networking role. The additional role output can be or include proposed interaction information indicative of proposed interactions between the proposed generic component placeholders. As described herein, a "proposed interaction" can refer to proposed communications between the components selected to fulfill the generic component placeholders (e.g., a generic database component placeholder, a generic security component placeholder, a generic virtualization component placeholder, etc.).

For example, if the generic component placeholders include a generic storage component placeholder and a generic logging component placeholder (e.g., to generate interaction logs), the proposed interactions will likely include a proposed interaction between the generic logging component and the generic storage component because a logging component is likely to communicate logs to a storage component for long-term storage. Conversely, if one of the generic component placeholders is a generic interface firewall component placeholder, it is less likely that the proposed interactions include a proposed interaction between the generic interface firewall component placeholder and the generic logging component placeholder.

In some implementations, using the agentic orchestration models to generate the role outputs can include processing the user response information and certain role output(s) (e.g., the generic component placeholder information, the proposed interaction information, etc.) with another agentic orchestration model to obtain a proposed architecture output associated with a visual depiction role. The proposed architecture output can be, include, or otherwise describe a visual representation of the proposed generic component placeholders (and additionally, in some implementations, the proposed interaction information). For example, the visual representation may be a diagram that depicts each of the proposed generic component placeholders at a particular location.

In some implementations, the proposed architecture output can be renderable software instructions that, when rendered, generates a rendering of an architecture diagram representation of the proposed generic component placeholders and the proposed interactions between the proposed generic component placeholders. Additionally, or alternatively, in some implementations, the proposed architectural output can be a rendering of an architecture diagram representation of the proposed generic component placeholders. In some implementations, the architecture diagram representation can be provided to a user computing device associated with the user response information (e.g., the user computing device that provided the user response information, etc.).

In some implementations, the user response information can include task information indicative of a particular task selected from a set of candidate tasks. In some implementations, the particular task can be a first type of visual representation task, and the processing logic can select the agentic orchestration models to be utilized from a set of candidate agentic orchestration models based on the particular task. Alternatively, the processing logic can select the prompts to provide to the agentic orchestration models to be utilized from a set of candidate prompts based on the particular task.

At operation 215, the processing logic can, based on the plurality of role outputs, generate a proposed architecture output that is, or otherwise includes, a visual representation of the proposed generic component placeholders. In some implementations, the processing logic can further process the user response information and at least the generic component placeholder information with another agentic orchestration model to obtain a role output associated with a component selection role. The role output can include information indicative of selected cloud components that are each selected from a set of candidate cloud components for a corresponding proposed generic component placeholder. For example, if the generic component placeholder information describes a generic "database" component placeholder, the cloud component selected for the placeholder can be a particular database type (e.g., a mySQL database) selected from a set of candidate database types (e.g., mySQL, SQL, PostgreSQL, etc.).

In some implementations, the processing logic can cause deployment of the plurality of selected cloud components. For example, the processing logic can deploy the selected cloud components described by the component selection information. Each of the selected cloud components can be deployed to interact with other selected cloud components in accordance with the proposed interactions between the proposed generic component placeholders. For example, if the proposed interaction information describes an interaction between the placeholders corresponding to two selected components, the two selected components can be configured to exchange information. Conversely, if the proposed interaction information does not describe an interaction between the placeholders corresponding to the two selected components, the two selected components may (or may not) be configured to be barred from exchanging information.

In some implementations, the processing logic can determine whether the plurality of selected cloud components fulfills the cloud architecture requirements. For example, the cloud architecture requirements may specify that the proposed cloud architecture must include a database capable of performing 100 interactions per second. The processing logic can determine whether the database component selected for the proposed cloud architecture is capable of meeting the cloud architecture requirement. Additionally, in some implementations, the processing logic can determine whether a combination of components meets the cloud architecture requirements. To follow the previous example, assume that the selected database component can perform 500 interactions per second. Further assume that a selected firewall component cannot process more than 80 interactions per second. In this instance, the processing logic can determine that the cloud architecture requirements are not met under operating conditions.

Figure 3:
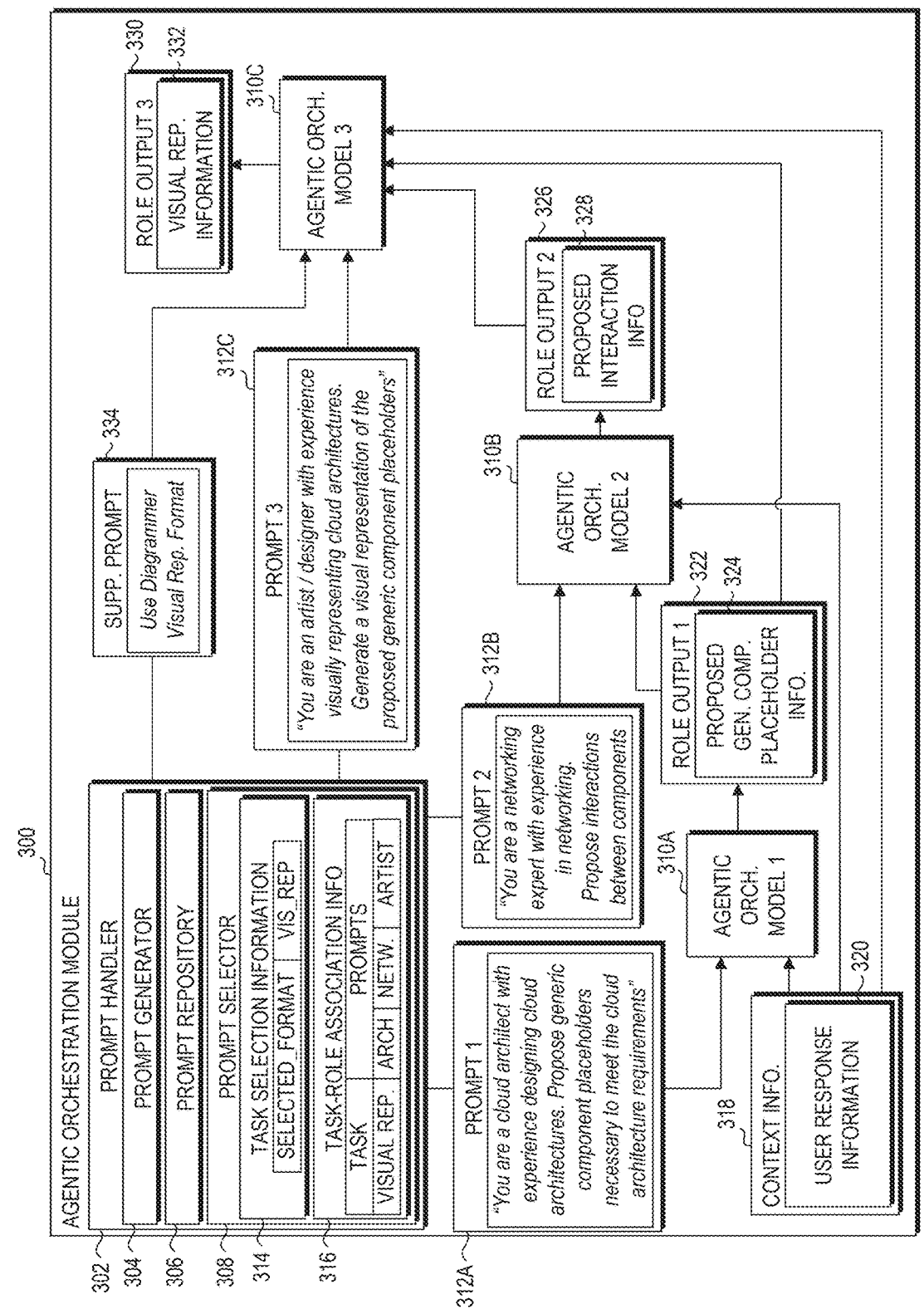
FIG. 3 is a block diagram of an agentic orchestration module utilized to generate a visual representation of a proposed cloud architecture according to some implementations of the present disclosure.

FIG. 3 is a block diagram of an agentic orchestration module utilized to generate a visual representation of a proposed cloud architecture according to some implementations of the present disclosure. Specifically, an agentic orchestration module 300 can be a module implemented by a computing system to implement agentic orchestration of machine-learned models, such as the agentic orchestration module 112 of FIG. 1. The agentic orchestration module 300 can include a prompt handler 302. The prompt handler 302 can include a prompt generator 304 and a prompt repository 306 as described with regards to the prompt generator 116 and prompt repository 118 of FIG. 1.

The prompt handler 302 can include a prompt selector 308. The prompt selector 308 can select prompts to prompt agentic orchestration models 310A-310C (generally, agentic orchestration models 310). As described previously, "agentically orchestrated" models generally refer to machine-learned model instances that fulfill certain cloud architecture development roles typically performed by agents of a cloud service provider or cloud platform (e.g., engineer, designer, artist, security specialist, developer operations specialist, etc.). To "fulfill" a particular role, the model can generate textual content (or other inputs) from the perspective of an agent that fulfills that particular role. For example, if prompted to fulfill a cloud engineering role, the model can generate textual content from the perspective of a cloud engineer. In other words, the model can emulate a "typical" agent that fulfills that particular role when generating content.

In some implementations, an agentic orchestration model can be prompted to fulfill a particular role with a prompt that describes the particular role. For example, an agentic orchestration model can be prompted with instructions to fulfill the particular role. It should be noted that, although the agentic orchestration models 310 are depicted as fulfilling particular roles in response to receiving prompts, other techniques can also be utilized to cause the agentic orchestration models 310 to fulfill the particular roles. For example, an agentic orchestration model can be optimized to fulfill a role via a training or fine-tuning process that adjusts weights of the model's parameters.

The prompt selector 308 can select prompts 312A-312C (generally, prompts 312) for the agentic orchestration models 310A-310C, respectively. In some implementations, the prompt selector 308 can select the prompts 312 based on task selection information 314. The task selection information 314 can be information indicative of a particular task for the agentic orchestration module 300 to perform. For example, assume that the agentic orchestration module 300 can perform a variety of different tasks, such as generating a visual diagram of a proposed cloud architecture, generating a textual summary of the architecture, performing a comparative analysis between a proposed cloud architecture and a different cloud architecture, etc. The task selection information 314 can indicate one (or more) of the tasks for the agentic orchestration module 300 to perform. Additionally, or alternatively, in some implementations, the task selection information 314 can indicate a particular format for an output requested from the agentic orchestration module. For example, the task selection information can indicate a visual diagram task and a particular format for the visual diagram, and the role can be a data flow diagramming (DFD) role.

In some implementations, the computing system can perform a validation process to validate the plurality of selected cloud components. For example, the computing system can perform the validation process by validating each of the selected cloud components based on a validation framework (e.g., to validate compatibility, security functionality, etc.). For another example, the computing system can perform the validation process by providing information descriptive of the cloud components to a third-party validation service.

In some implementations, the prompt selector 308 can include task-role association information 316. The task-role association information 316 can describe the roles of agents necessary to perform a particular task. Based on the task-role association information 316, the prompt selector can select prompts to provide to the agentic orchestration models. Additionally, or alternatively, in some implementations, the agentic orchestration module 300 can select agentic orchestration models already optimized to fulfill the roles indicated by the task-role association information 316.

To follow the depicted example, the task selection information 314 can indicate a visual representation task. The task-role association information 316 can indicate that a solutions architect role, a networking role, and an artist role are required to fulfill the visual representation tasks. In response, the prompt selector 308 can select the prompt 312A to prompt the agentic orchestration model 310A to perform a cloud architect role. The prompt selector 308 can select the prompt 312B to prompt the agentic orchestration model 310B to perform a cloud architect role. The prompt selector 308 can select the prompt 312C to prompt the agentic orchestration model 310C to perform an artist or designer role.

In some implementations, the task-role association information 316 can describe an order in which the agentic orchestration models 310 are to be utilized. More specifically, when multiple agentic orchestration models are utilized, the models can successively process the outputs of preceding models as inputs to "conversationally" utilize the outputs of preceding models as context. For example, if an agentic orchestration model prompted to fulfill a cloud architecture role generates a cloud architecture output, a subsequent agentic orchestration model prompted to fulfill an artist or design role can process the cloud architecture output to generate a visual representation of the cloud architecture output. As such, the task-role association information 316 can indicate an order in which the agentic orchestration models 310 are to be utilized. The task-role association information 316 can also indicate whether an agentic orchestration model is to take another models output as input.

The agentic orchestration module 300 can obtain context information 318. The context information 318 can be descriptive of particular cloud architecture requirements to be fulfilled by the proposed cloud architecture. In some implementations, the context information 318 can be provided by a user. The context information 318 can include user response information 320 received in response to a query (or multiple queries) provided to a user. For example, a user can be provided with a questionnaire that includes multiple queries to the user regarding the cloud architecture to be proposed. The particular cloud architecture requirements can be described by, or otherwise inferred from, the user response information 320. Alternatively, in some implementations, the context information 318 can be obtained from a source other than a user. For example, the context information 318 can be generated by an automated process.

The prompt selector 308 can select the prompt 312A for the agentic orchestration model 310A to process. In turn, processing the prompt 312A can cause the agentic orchestration model 310A to process successive (or concurrent) inputs while fulfilling a cloud architect role. In other words, the agentic orchestration model 310A can generate outputs from the perspective of a typical cloud architect. To follow the depicted example, the agentic orchestration module 300 can utilize the agentic orchestration model 310A to process the prompt 312A and the context information 318 to obtain a role output 322. As described herein, a "role output" generally refers to a type of "output" or "work" typically produced by an agent in the role being fulfilled by the agentic orchestration model. For example, the role output for an agentic orchestration model fulfilling a network engineer role may be a configuration file specifying various networking parameters. For another example, the role output for an agentic orchestration model fulfilling an artist role may be a visual representation of a cloud architecture.

The role output 322 can be, or otherwise include, proposed generic component placeholder information 324. The proposed generic component placeholder information 324 can describe generic placeholders for particular "types" of components that are to be later selected. For example, the proposed generic component placeholder information 324 may include a generic component placeholder for a database component without specifying which type of database is to be selected. For another example, the proposed generic component placeholder information 324 may include a generic component placeholder for a type of database component (e.g., a relational database) without specifying which particular sub-type of the type of database is to be selected (e.g., PostgreSQL, mySQL, etc.). As such, it should be generally understood that the proposed generic component placeholder information 324 can indicate generic placeholder components with varying degrees of specificity. The proposed generic component placeholders are visualized and described in greater detail with regards to FIG. 4.

Based on the task selection information 314, the prompt selector 308 can select the prompt 312B for the agentic orchestration model 310B to process. In turn, processing the prompt 312B can cause the agentic orchestration model 310B to process successive (or concurrent) inputs while fulfilling a network engineering role (e.g., an expert in configuring communications in a cloud environment). Once prompted, the agentic orchestration module 300 can utilize the agentic orchestration model 310B to process a set of inputs to obtain a role output 326. The role output 326 can include proposed interaction information 328. The set of inputs can include the prompt 312B, the proposed generic component placeholder information 324, and/or the user response information 320.

The proposed interaction information 328 can indicate proposed interactions between the generic component placeholders of the generic component placeholder information 324. For example, assume that the generic component placeholder information 324 is indicative of a generic Application Programming Interface (API) component placeholder and some other generic component placeholder. The proposed interaction information 328 can indicate whether the other generic component placeholder is permitted communicate with the API or if the generic component placeholder is restricted from communicating with the API.

In some implementations, the proposed interaction information 328 can describe communication characteristics for communications between the generic component placeholders (or the components to be selected for those placeholders). Examples of communication characteristics can include latency, bandwidth, communication frequency, necessary security protocols, necessary operations for regulatory compliance (e.g., deleting or obfuscating communications for privacy purposes, etc.), etc. For example, the proposed interaction information 328 can specify a bandwidth to be configured for communications between components selected for two of the generic component placeholders (e.g., a bandwidth of 10 Mbps for communications between a generic database placeholder and a generic storage placeholder). Additionally, or alternatively, in some implementations, the proposed interaction information 328 can specify minimum and/or maximum values for certain communication characteristics. To follow the previous example, the proposed interaction information 328 can specify a minimum bandwidth and a maximum bandwidth to be configured for communications between components selected for the two generic component placeholders.

Based on the task selection information 314, the prompt selector 308 can select the prompt 312C for the agentic orchestration model 310C to process. In turn, processing the prompt 312C can cause the agentic orchestration model 310C to process successive (or concurrent) inputs while fulfilling an artist or design role (e.g., an expert in creating visual representations of cloud architectures). Once prompted, the agentic orchestration module 300 can utilize the agentic orchestration model 310C to process a set of inputs to obtain a role output 330. The role output 330 can include visual representation information 332. The set of inputs can include the prompt 312C, the proposed generic component placeholder information 324, the proposed interaction information 328, and/or the user response information 320.

Additionally, in some implementations, the prompt selector 308 can select a supplemental prompt 334 for the agentic orchestration model 310C in addition to the prompt 312C. The supplemental prompt 334 can include task-specific information or instructions for the agentic orchestration model 310C. To follow the depicted example, the supplemental prompt 334 can specify a particular format for the agentic orchestration model 310C to utilize when generating the visual representation information 332 (e.g., a "Diagrammer" visual representation format).

In some implementations, the visual representation information 332 can include image(s) that depict a proposed cloud architecture that includes the proposed generic component placeholders and the proposed interactions. A non-limiting example of such is provided with regards to FIG. 4. Alternatively, in some implementations, the visual representation information 332 can include software instructions (i.e., programmatic code, machine-readable code, etc.) that, when processed or executed, can produce an image or interactable representation of the proposed generic component placeholders and the proposed interactions.

Figure 4:
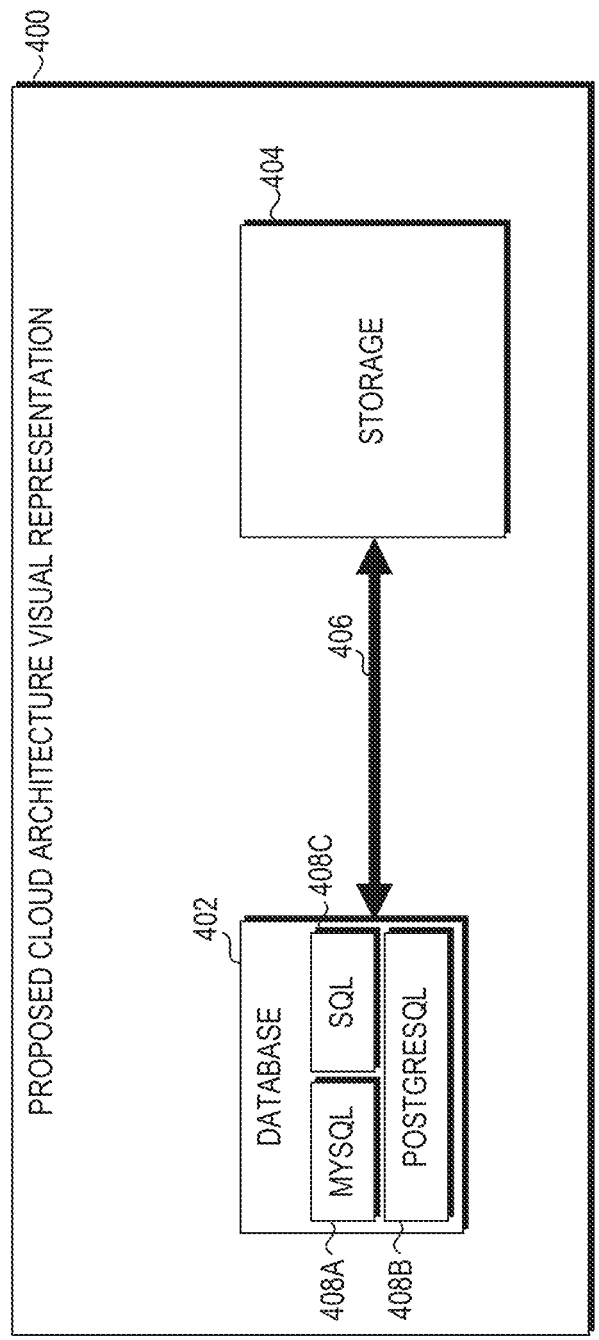
FIG. 4 illustrates an example visual representation of a proposed cloud architecture according to some implementations of the present disclosure.

FIG. 4 illustrates an example visual representation of a proposed cloud architecture diagram according to some implementations of the present disclosure. As illustrated, visual representation 400 can be a visual representation (e.g., an image, a series of images, video data, renderable software instructions, etc.) that depicts a proposed cloud architecture diagram. Alternatively, the visual representation 400 can be a proposed cloud architecture diagram. The visual representation 400 can depict proposed generic component placeholders and corresponding proposed interactions that are determined as described with regards to FIG. 3.

The visual representation 400 can include generic component placeholder elements. A generic component placeholder element represents a generic component placeholder (e.g., as indicated by the proposed generic component placeholder information 324 of FIG. 3). The generic component placeholder elements can serve as visual indicators to the user that particular types of components are needed to create a cloud architecture that meets the cloud architecture requirements. The visual representation 400 can depict a generic database placeholder element 402 and a generic storage placeholder element 404. The generic database placeholder element 402 can represent a generic database component placeholder for a future database component to be selected for the proposed cloud architecture. More generally, the generic database placeholder element 402, as depicted, can indicate to a user that some type of "database" component is needed without indicating a particular type of database. Similarly, the generic storage placeholder element 402 can indicate that some type of "storage" component is needed without selecting a particular type of storage component.

As described previously, a "component" generally refers to a collection of hardware and/or software resources that collectively provide a function or service. For example, assume that a particular type of database is selected for the placeholder represented by the generic database placeholder element 402. The selected database may be utilized by instantiating that particular type of database using cloud platform resources. Alternatively, the selected database may be utilized by partnering with a database service provider that instantiates and maintains that particular type of database using third-party resources. As such, the existence of a proposed generic component placeholder does not necessarily imply selection of a component to be implemented using cloud resources.

In some implementations, the generic component placeholder elements 402 and 404 can include suggested component elements. The suggested component elements can indicate particular components that correspond to the component type represented by the generic component placeholder elements. For example, as depicted, the generic database placeholder element 402 can include suggested component elements 408A-408C (generally, suggested component elements 408). Each of the suggested component elements 408 can represent a particular database service that can replace the generic database placeholder while fulfilling the cloud architecture requirements. In some implementations, the suggested component elements 408 can be selectable to select one of the particular database services to replace the generic database placeholder. For example, selection of the suggested component element 408A by a user can cause a particular database service to be implemented for the proposed cloud architecture.

In some implementations, the visual representation 400 can depict a proposed interaction element 406 indicating a proposed interaction between a component selected for the generic database placeholder element 402 and a component selected for the generic storage placeholder element 404. The proposed interaction element 406 indicated by the proposed interaction element 406 can refer to any type or manner of connection, exchange of information, communication, etc. For example, the proposed interaction element 406 may represent a socket connection. For another example, the proposed interaction element 406 may represent a regular exchange of information (e.g., storing a backup of a database, restoring a database from a stored backup, etc.).

Figure 5A:
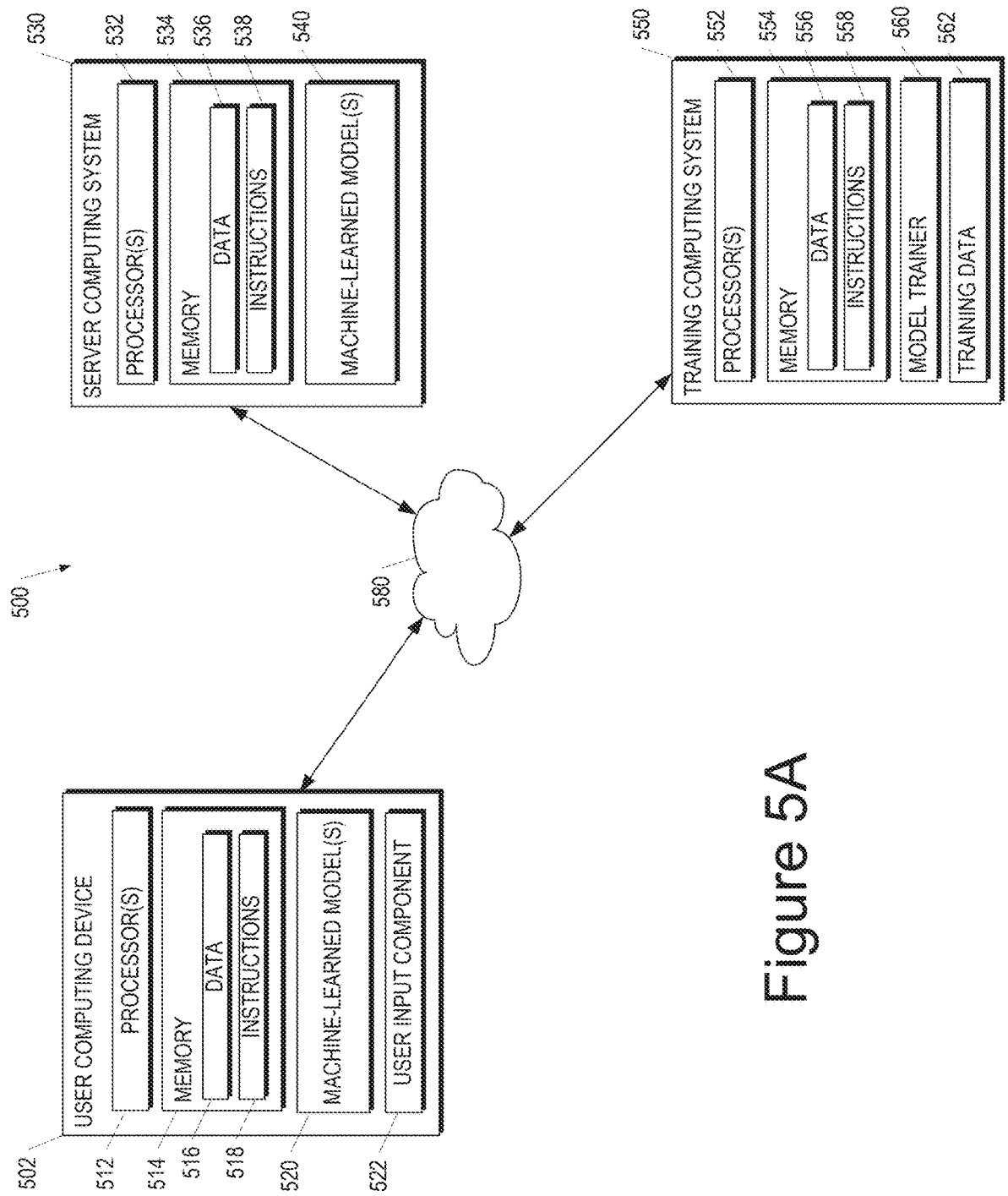
FIG. 5A depicts a block diagram of an example computing system that performs agentic orchestration of foundational models for cloud architecture development according to some implementations of the present disclosure.

FIG. 5A depicts a block diagram of an example computing system 500 that performs agentic orchestration of foundational models for cloud architecture development according to example embodiments of the present disclosure. The system 500 includes a user computing device 502, a server computing system 530, and a training computing system 550 that are communicatively coupled over a network 580.

The user computing device 502 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 502 includes one or more processors 512 and a memory 514. The one or more processors 512 can be any suitable processing device (e.g., a processor core, a microprocessor, an ASIC, an FPGA, a controller, a microcontroller, etc.) and can be one processor or a plurality of processors that are operatively connected. The memory 514 can include one or more non-transitory computer-readable storage media, such as RAM, ROM, EEPROM, EPROM, flash memory devices, magnetic disks, etc., and combinations thereof. The memory 514 can store data 516 and instructions 518 which are executed by the processor 512 to cause the user computing device 502 to perform operations.

In some implementations, the user computing device 502 can store or include one or more machine-learned models 520. For example, the machine-learned models 520 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example models 520 are discussed with reference to FIGS. 1-3.

In some implementations, the one or more machine-learned models 520 can be received from the server computing system 530 over network 580, stored in the user computing device memory 514, and then used or otherwise implemented by the one or more processors 512. In some implementations, the user computing device 502 can implement multiple parallel instances of a single machine-learned model 520 (e.g., to perform agentic orchestration across multiple instances of the machine-learned model 520).

More particularly, the machine-learned models 520 can generally be, or otherwise include, any type or manner of machine-learned or statistical model that can generate outputs such as images, visual representations, software instructions, textual content, etc. For example, the machine-learned models 520 can be large foundational models trained on large corpuses of data to generate multiple types of outputs. Alternatively, in some implementations, the machine-learned models 520 can be specific models purpose-trained to perform a particular task (e.g., a natural language model, a generative image model, etc.).

Additionally or alternatively, one or more machine-learned models 540 can be included in or otherwise stored and implemented by the server computing system 530 that communicates with the user computing device 502 according to a client-server relationship. For example, the machine-learned models 540 can be implemented by the server computing system 530 as a portion of a web service (e.g., a cloud computing platform). Thus, one or more models 520 can be stored and implemented at the user computing device 502 and/or one or more models 540 can be stored and implemented at the server computing system 530.

The user computing device 502 can also include one or more user input components 522 that receives user input. For example, the user input component 522 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 530 includes one or more processors 532 and a memory 534. The one or more processors 532 can be any suitable processing device (e.g., a processor core, a microprocessor, an ASIC, an FPGA, a controller, a microcontroller, etc.) and can be one processor or a plurality of processors that are operatively connected. The memory 534 can include one or more non-transitory computer-readable storage media, such as RAM, ROM, EEPROM, EPROM, flash memory devices, magnetic disks, etc., and combinations thereof. The memory 534 can store data 536 and instructions 538 which are executed by the processor 532 to cause the server computing system 530 to perform operations.

In some implementations, the server computing system 530 includes or is otherwise implemented by one or more server computing devices. In instances in which the server computing system 530 includes plural server computing devices, such server computing devices can operate according to sequential computing architectures, parallel computing architectures, or some combination thereof.

As described above, the server computing system 530 can store or otherwise include one or more machine-learned models 540. For example, the models 540 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 502 and/or the server computing system 530 can train the models 520 and/or 540 via interaction with the training computing system 550 that is communicatively coupled over the network 580. The training computing system 550 can be separate from the server computing system 530 or can be a portion of the server computing system 530.

The training computing system 550 includes one or more processors 552 and a memory 554. The one or more processors 552 can be any suitable processing device (e.g., a processor core, a microprocessor, an ASIC, an FPGA, a controller, a microcontroller, etc.) and can be one processor or a plurality of processors that are operatively connected. The memory 554 can include one or more non-transitory computer-readable storage media, such as RAM, ROM, EEPROM, EPROM, flash memory devices, magnetic disks, etc., and combinations thereof. The memory 554 can store data 556 and instructions 558 which are executed by the processor 552 to cause the training computing system 550 to perform operations. In some implementations, the training computing system 550 includes or is otherwise implemented by one or more server computing devices.

The training computing system 550 can include a model trainer 560 that trains the machine-learned models 520 and/or 540 stored at the user computing device 502 and/or the server computing system 530 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 560 can perform a number of generalization techniques (e.g., weight decays, dropouts, etc.) to improve the generalization capability of the models being trained. In particular, the model trainer 560 can train the machine-learned models 520 and/or 540 based on a set of training data 562.

In some implementations, if the user has provided consent, the training examples can be provided by the user computing device 502. Thus, in such implementations, the model 520 provided to the user computing device 502 can be trained by the training computing system 550 on user-specific data received from the user computing device 502. In some instances, this process can be referred to as personalizing the model.

The model trainer 560 includes computer logic utilized to provide desired functionality. The model trainer 560 can be implemented in hardware, firmware, and/or software controlling a general purpose processor. For example, in some implementations, the model trainer 560 includes program files stored on a storage device, loaded into a memory and executed by one or more processors. In other implementations, the model trainer 560 includes one or more sets of computer-executable instructions that are stored in a tangible computer-readable storage medium such as RAM, hard disk, or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 5A illustrates one example computing system that can be used to implement the present disclosure. Other computing systems can be used as well. For example, in some implementations, the user computing device 502 can include the model trainer 560 and the training dataset 562. In such implementations, the models 520 can be both trained and used locally at the user computing device 502. In some of such implementations, the user computing device 502 can implement the model trainer 560 to personalize the models 520 based on user-specific data.

Figure 5B:
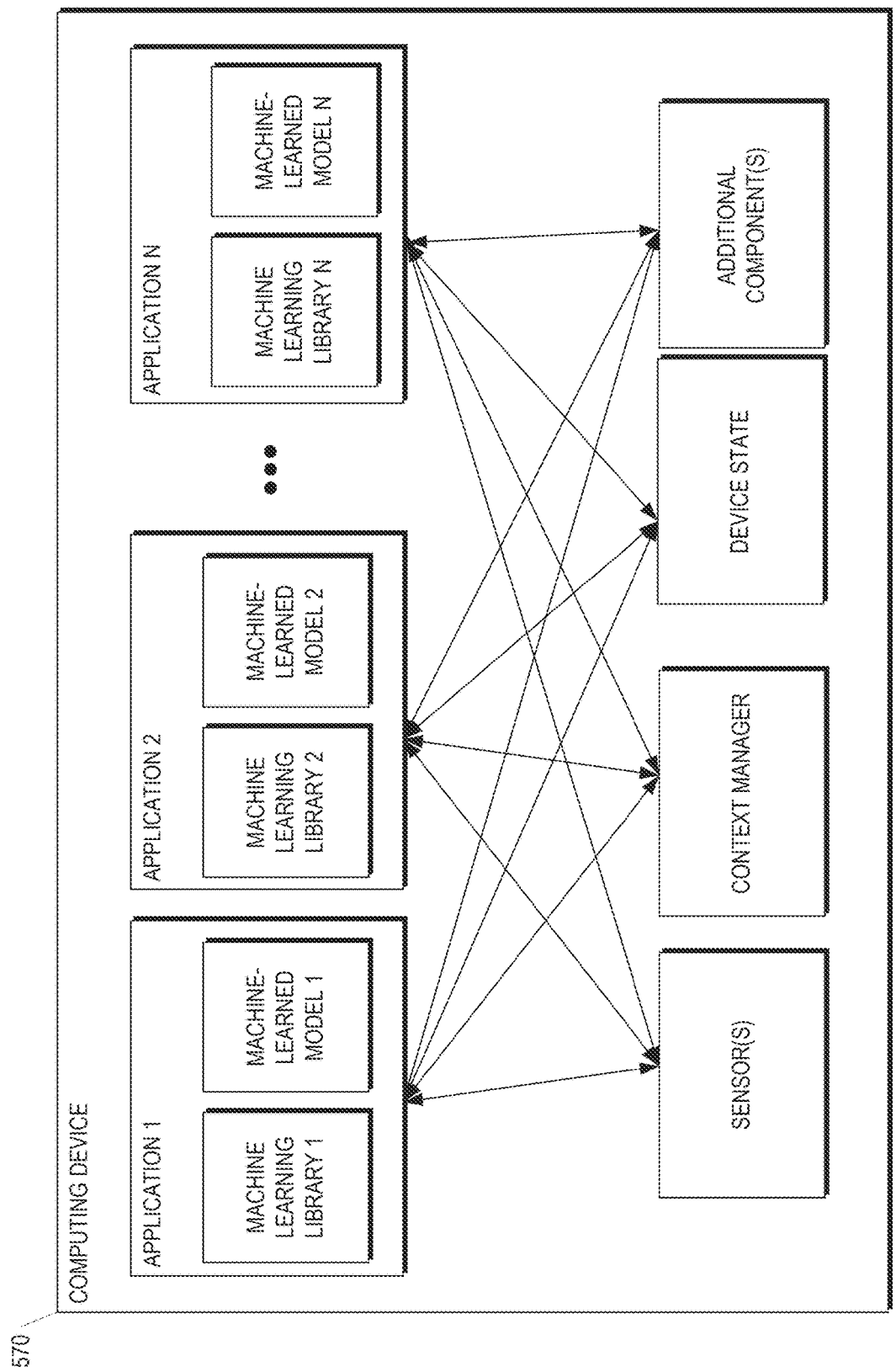
FIG. 5B depicts a block diagram of an example computing device that performs training of machine-learned models, such as agentic orchestration models, according to some implementations of the present disclosure.

FIG. 5B depicts a block diagram of an example computing device 570 that performs training of machine-learned models, such as agentic orchestration models, according to example implementations of the present disclosure. The computing device 570 can be a user computing device or a server computing device.

The computing device 570 includes a number of applications (e.g., applications 5 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
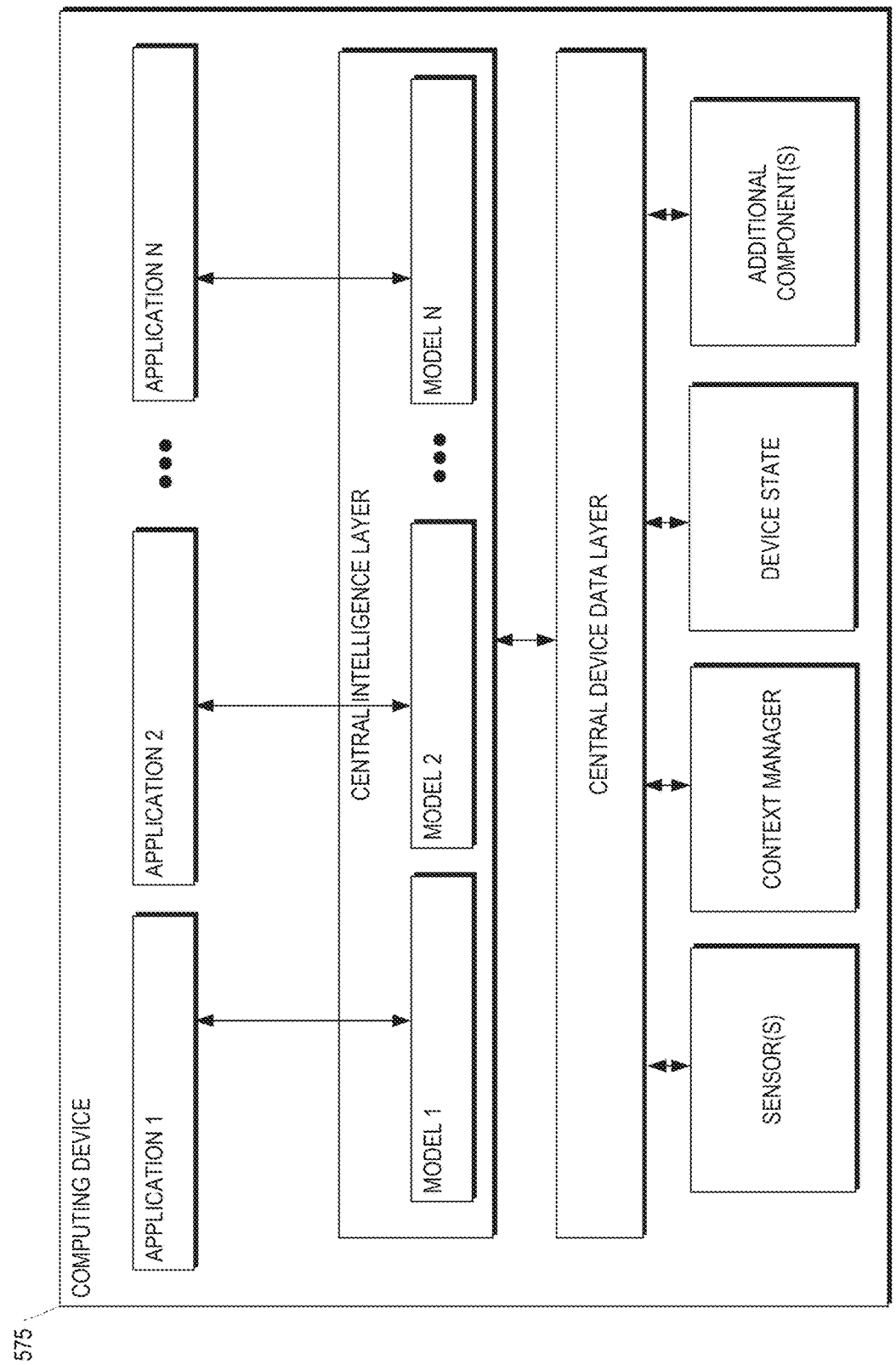
FIG. 5C depicts a block diagram of an example computing device that generates visual representations of proposed cloud architectures according to some implementations of the present disclosure.

FIG. 5C depicts a block diagram of an example computing device 575 that generates visual representations of proposed cloud architectures according to some implementations of the present disclosure. The computing device 575 can be a user computing device or a server computing device.

The computing device 575 includes a number of applications (e.g., applications 5 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 575.

The central intelligence layer can communicate with a central device data layer. The central device data layer can be a centralized repository of data for the computing device 575. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
    obtaining, by a computing system comprising one or more processor devices, user response information comprising information indicative of cloud architecture requirements for a cloud architecture to fulfill;
    based on the user response information, using, by the computing system, a plurality of agentic orchestration models to generate a respective plurality of role outputs, each of the plurality of agentic orchestration models comprising a machine-learned language model prompted to fulfill a corresponding cloud architecting role of a plurality of cloud architecting roles, wherein one of the plurality of role outputs is indicative of a plurality of proposed generic component placeholders for components necessary to meet the cloud architecture requirements; and
    based on the plurality of role outputs, generating, by the computing system, a proposed architecture output comprising a visual representation of the proposed generic component placeholders.

2. The computer-implemented method of claim 1, wherein using the plurality of agentic orchestration models to generate the respective plurality of role outputs comprises:

processing, by the computing system, the user response information with a first agentic orchestration model of the plurality of agentic orchestration models to obtain a first role output associated with a component identification role, wherein the first role output identifies the plurality of proposed generic component placeholders for the components necessary to meet the cloud architecture requirements.

3. The computer-implemented method of claim 2, wherein using the plurality of agentic orchestration models to generate the respective plurality of role outputs further comprises:

processing, by the computing system, the user response information and the first role output with a second agentic orchestration model of the plurality of agentic orchestration models to obtain a second role output associated with a data flow diagramming role, wherein the second role output is indicative of a plurality of proposed interactions between the proposed generic component placeholders; and wherein the proposed architecture output further comprises a visual representation of the proposed interactions between the proposed generic component placeholders.

4. The computer-implemented method of claim 3, wherein the plurality of proposed generic component placeholders comprises at least one of:

a generic database or storage component placeholder;
  a generic security component placeholder; or
  a generic virtualization component placeholder.

5. The computer-implemented method of claim 3, wherein the using the plurality of agentic orchestration models to generate the respective plurality of role outputs further comprises:

processing, by the computing system, the user response information and at least the second role output with a third agentic orchestration model of the plurality of agentic orchestration models to obtain a third role output associated with a visual depiction role, wherein the third role output comprises the proposed architecture output.

6. The computer-implemented method of claim 5, wherein the proposed architecture output comprises renderable software instructions that, when rendered, depicts an architecture diagram representation of the proposed generic component placeholders and the plurality of proposed interactions between the proposed generic component placeholders.

7. The computer-implemented method of claim 6, wherein the method further comprises:

rendering, by the computing system, the renderable software instructions to obtain the architecture diagram representation; and providing, by the computing system, the architecture diagram representation to a user computing device associated with the user response information.

8. The computer-implemented method of claim 5, wherein the method further comprises:

processing, by the computing system, the user response information and at least the second role output with a fourth agentic orchestration model of the plurality of agentic orchestration models to obtain a fourth role output associated with a component selection role, wherein the fourth role output comprises information indicative of a plurality of selected cloud components, each being selected from a set of candidate cloud components for a corresponding proposed generic component placeholder of the plurality of proposed generic component placeholders.

9. The computer-implemented method of claim 8, wherein the method further comprises:

causing, by the computing system, deployment of the plurality of selected cloud components.

10. The computer-implemented method of claim 9, wherein causing deployment of the plurality of selected cloud components comprises:

deploying, by the computing system, the plurality of selected cloud components, wherein each of the plurality of selected cloud components are deployed to interact with other selected cloud components in accordance with the proposed interactions between the proposed generic component placeholders.

11. The computer-implemented method of claim 10, wherein the method further comprises:

performing, by the computing system, a validation process to validate the plurality of selected cloud components.

12. The computer-implemented method of claim 1, wherein the user response information further comprises task information indicative of a particular task selected from a plurality of candidate tasks, wherein the particular task comprises a first type of visual representation task; and wherein using the plurality of agentic orchestration models to generate the respective plurality of role outputs comprises:

selecting, by the computing system, a plurality of prompts to respectively prompt the plurality of agentic orchestration models based on the particular task.

13. The computer-implemented method of claim 12, wherein the plurality of candidate tasks comprises:

the first type of visual representation task, wherein the first type of visual representation task is associated with renderable software instructions that, when rendered, depict a proposed architecture diagram;

a second type of visual representation task associated with an image that depicts the proposed architecture diagram; or a summarization output type that summarizes the proposed architecture diagram.

14. The computer-implemented method of claim 1, wherein, prior to obtaining the user response information, the method comprises:

providing, by the computing system to a user computing device, questionnaire information descriptive of a cloud architecture questionnaire comprising a plurality of architecture queries; and responsive to providing the questionnaire information, receiving, by the computing system, the user response information from the user computing device, wherein the user response information comprises textual content responsive to the plurality of architecture queries.

15. A computing system, comprising:

one or more processor devices;
  one or more tangible, non-transitory computer readable media storing computer-readable instructions that when executed by the one or more processor devices cause the computing system to perform operations, the operations comprising:

obtaining user response information comprising information indicative of cloud architecture requirements for a cloud architecture to fulfill;

based on the user response information, using a plurality of agentic orchestration models to generate a respective plurality of role outputs, each of the plurality of agentic orchestration models comprising a machine-learned language model prompted to fulfill a corresponding cloud architecting role of a plurality of cloud architecting roles, wherein one of the plurality of role outputs is indicative of a plurality of proposed generic component placeholders for components necessary to meet the cloud architecture requirements; and based on the plurality of role outputs, generating a proposed architecture output comprising a visual representation of the proposed generic component placeholders.

16. The computing system of claim 15, wherein using the plurality of agentic orchestration models to generate the respective plurality of role outputs comprises:

processing the user response information with a first agentic orchestration model of the plurality of agentic orchestration models to obtain a first role output associated with a component identification role, wherein the first role output identifies the plurality of proposed generic component placeholders for the components necessary to meet the cloud architecture requirements.

17. The computing system of claim 16, wherein using the plurality of agentic orchestration models to generate the respective plurality of role outputs further comprises:

processing the user response information and the first role output with a second agentic orchestration model of the plurality of agentic orchestration models to obtain a second role output associated with a networking role, wherein the second role output is indicative of a plurality of proposed interactions between the proposed generic component placeholders; and wherein the proposed architecture output further comprises a visual representation of the proposed interactions between the proposed generic component placeholders.

18. The computing system of claim 17, wherein the plurality of proposed generic component placeholders comprises at least one of:

a generic database component placeholder;

a generic security component placeholder; or a generic virtualization component placeholder.

19. The computing system of claim 18, wherein the using the plurality of agentic orchestration models to generate the respective plurality of role outputs further comprises:

processing the user response information and at least the second role output with a third agentic orchestration model of the plurality of agentic orchestration models to obtain a third role output associated with a visual depiction role, wherein the third role output comprises the proposed architecture output.

20. One or more tangible, non-transitory computer readable media storing computer-readable instructions that when executed by one or more processor devices cause the one or more processor devices to perform operations, the operations comprising:

obtaining user response information comprising information indicative of cloud architecture requirements for a cloud architecture to fulfill;

processing the user response information with a first agentic orchestration model of a plurality of agentic orchestration models to obtain a first role output associated with a component identification role, wherein each of the plurality of agentic orchestration models comprises a machine-learned model that fulfills a corresponding role of a plurality of roles, and wherein the first role output identifies a plurality of proposed generic component placeholders for components necessary to meet the cloud architecture requirements;

processing the user response information and the first role output with a second agentic orchestration model of the plurality of agentic orchestration models to obtain a second role output associated with a networking role, wherein the second role output is indicative of a plurality of proposed interactions between the plurality of proposed generic component placeholders; and processing the user response information and at least the second role output with a third agentic orchestration model of the plurality of agentic orchestration models to obtain a third role output associated with a visual depiction role, wherein the third role output comprises a visual representation of the plurality of proposed generic component placeholders and the plurality of proposed interactions.

* * * * *